July 18, 1933.    G. W. WALTON    1,919,139
ALTERNATING CURRENT GENERATOR
Filed March 10, 1932

Patented July 18, 1933

1,919,139

UNITED STATES PATENT OFFICE

GEORGE WILLIAM WALTON, OF LONDON, ENGLAND

ALTERNATING CURRENT GENERATOR

Application filed March 10, 1932, Serial No. 598,076, and in Great Britain February 20, 1931.

The present invention relates to alternating current generators of the kind in which the frequency of the electrical oscillations generated is determined by a mechanical vibratory system.

It is an object of the present invention to provide a device capable of generating oscillations having a wave form which approximates very closely to a true sine wave and a device in which the frequency generated is substantially independent of the amplitude over a considerable range of amplitude.

The present invention is more particularly, but not exclusively, concerned with generators adapted to produce current of very low frequency, for example 20 cycles per second or less, and is particularly applicable to television where a constant frequency of accurate wave form is required for synchronization and phasing. Hitherto such generators have had a number of defects, and it has been almost impossible to obtain an accurate wave form, such as is absolutely essential in television apparatus embodying oscillatory scanning devices, and also in some systems of synchronization.

It is an object of the preesnt invention to provide an improved electrical oscillation generator in which the frequency of the oscillations generated is determined by a mechanical vibratory system and in which the wave form of the electrical oscillations is a function of the wave form of the vibrations of a part of the mechanical vibratory system. According to a feature of this invention, the mechanical vibratory system is characterized in that the mechanical vibratory system comprises a lumped mass and a lumped compliance element. That is to say the mass of the compliance element is very small in comparison with that of the mass element and the compliance of the mass element is very small in comparison with that of the compliance element.

Thus in this aspect the present invention is clearly distinguished from known oscillation generators embodying tuning forks, piezo-electric crystals and the like since in these the mass and compliance are distributed. The present invention is also distinguished from known induction coils with vibratory make and break devices since the vibrations of these devices do not control the wave form of the oscillations generated in the coils.

Other features of the invention will be apparent from the accompanying claims and from the following description in which reference will be made to the accompanying drawing which illustrates by way of example two embodiments of the invention.

Figure 1:
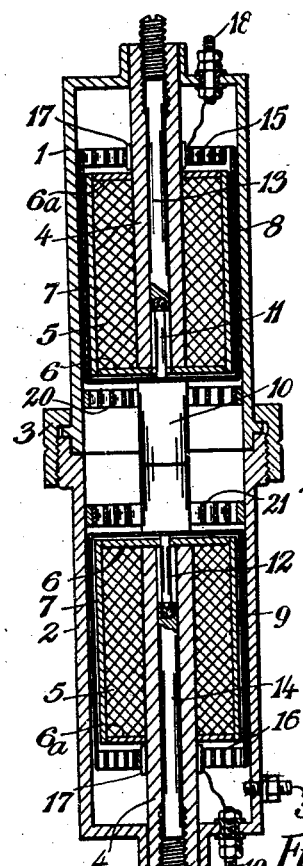
Figure 2:
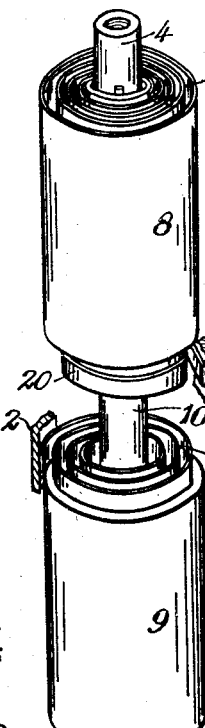
Figure 4:
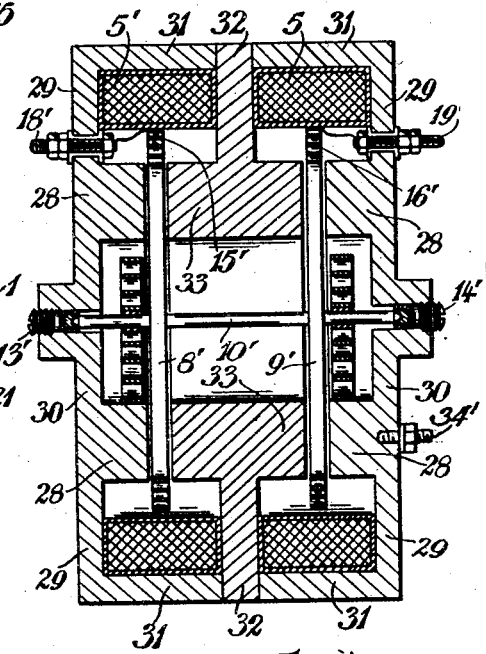
Figure 3:
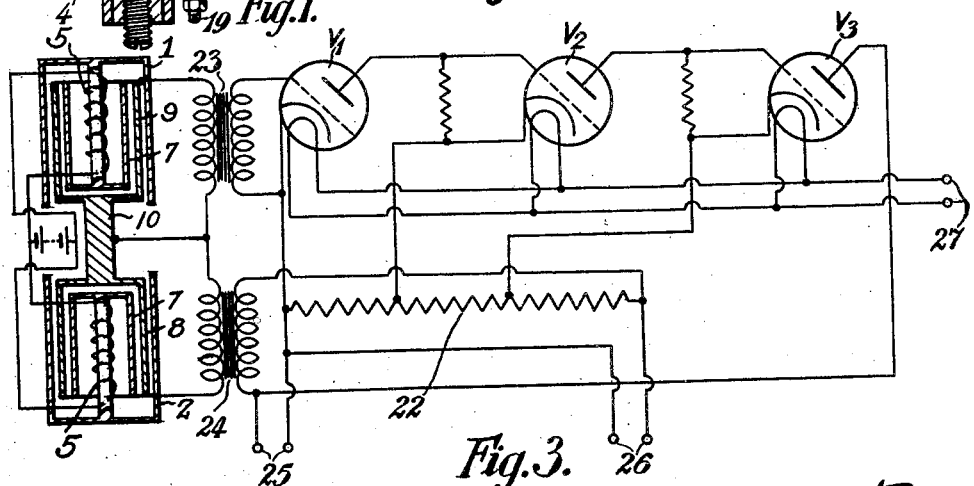

In the drawing, Fig. 1 is a view in sectional elevation of one form of mechanical vibratory device in accordance with the present invention, Fig. 2 is a perspective view of a part of the device of Fig. 1, Fig. 3 is a circuit diagram showing one way in which the device of Fig. 1 may be used in an oscillation generator according to the invention, and Fig. 4 is a view in sectional elevation of a second form of vibratory device which may be used in place of that shown in Fig. 1.

Referring to Figs. 1 and 2, a casing is in two parts 1 and 2 united by an internally threaded union nut 3 engaging an externally threaded portion of the part 2. Within the casing part 1 is a core 4 around which is a coil 5. The end of the core 4 is provided with a disc 6 having attached to its periphery a sleeve 7 which surrounds the coil 5 but does not extend to the end of the casing 1. The members 1, 4, 6 and 7 are of magnetic material and constitute a magnetic circuit adapted to be energized by direct current passed through the coil 5. An annular air gap is formed between the inner cylindrical surface of the wall of the casing 1 and the outer cylindrical surface of the sleeve 7. A similar magnetic circuit is associated with the part 2 of the casing. The closure discs 6a at the ends of the coils 5 are of non-magnetic material.

The vibratory member of the device comprises two cylindrical metal shells 8 and 9 connected by a rod 10. The rod 10 may be in two parts so as to permit the separation of the cylinders 8 and 9 by pulling one axially away from the other but the securing means between the two parts of the rod 10 are then made such that torsional vibration is transmitted without "shake".

Within the shells 8 and 9 are fixed pivot pins 11 and 12 the ends of which engage in jewelled bearings carried by rods 13 and 14 which are adjustable longitudinally. The shells are located within the annular air gaps of the two magnetic circuits and care is taken to prevent any contact between the walls of the air gaps and the cylinders. At the upper end of the upper cylinder 8 and the lower end of the lower cylinder 9 are provided spiral springs 15 and 16 respectively secured at their outer ends to the cylinders and at their inner ends to insulating collars 17 fixed to the core 4. The springs 15 and 16 are of opposite hand so that when the cylinders 8 and 9 are rotated about their axis the diameter of one of the springs is increased and that of the other spring is decreased.

The inner ends of the springs 15 and 16 are electrically connected to terminals 18 and 19 respectively which are insulated from the casing 1, 2.

Two further spiral springs 20 and 21 may be provided between the two cylinders 8 and 9, the inner ends of these springs being connected to the rod 10 and the outer ends being connected to the casing 1, 2. These springs 20 and 21 are also of opposite hand. The arrangement of the springs 15, 16, 20 and 21 can be seen most clearly from Fig. 2, in which the two cylinders 8 and 9 and the associated springs are shown with most of the casing 1, 2 removed.

Electrical connections with the two ends of the cylinder 8 are made by terminals 18 and 34, the latter being in electrical connection with the casing 1, 2. Connections with the two ends of cylinder 9 are made by terminals 19 and 34. If desired, the outer ends of one or both of the springs 20 and 21 may be insulated from the casing 1, 2 and connected electrically to one or more terminals so that no electrical connection is made through the casing. Suitable terminals are provided to which the ends of the coils 5 are connected, but these are not shown in the drawing.

Assuming that cylinder 8 is to act as the armature of the motor portion and the cylinder 9 as the armature of the generator portion, the part 1 and upper parts 4, 6 and 7, together with the upper coil 5, constitute means for maintaining a uni-directional magnetic field of substantially constant intensity through the movable conductor 8, through which alternating current is passed to produce vibration thereof, while the part 2 and lower parts 4, 6 and 7 constitute with lower coil 5 means for maintaining a uni-directional magnetic field of substantially constant intensity through the movable conductor 9 in which alternating voltages are developed in response to vibration thereof.

It will be evident that when a current is passed from one end of the cylinder 8 to the other through terminal 18 and the casing, the magnetic circuits being energized by current passed through the coils 5, the cylinders 8 and 9 will rotate about their axis and a potential difference will be generated between the ends of the cylinder 9, and accordingly between the terminal 19 and the casing.

The cylinders 8, 9 and the rod 10 constitute a lumped mass and the springs 15, 16, 20 and 21 constitute a lumped compliance of a mechanical vibratory system, and the values of mass and compliance are selected to give the system the desired natural frequency, for example 10 cycles per second. If, then, an alternating current of 10 cycles per second be passed through the cylinder 8 (from end to end) the cylinders 8 and 9 will vibrate at 10 cycles per second about their axis and alternating potential differences of the same frequency will be developed across the ends of the cylinder 9.

One manner in which a device such as has been described may be used to generate sustained electrical oscillations is illustrated in Fig. 3.

To the left of Fig. 3 is shown diagrammatically the motor generator of Figure 1 and the electrical connections thereto. The potential differences developed across the ends of cylinder 9 due to vibration thereof are applied by a transformer 23 to the grid circuit of a thermionic valve $V_1$ which is coupled to two further amplifiers $V_2$ and $V_3$. The coupling is made directly from the anode of one valve to the grid of the next, in known manner, and suitable potentials are applied to the various parts from a potential divider 22, the ends of which are connected at terminals 26 to a source of direct current, for example rectified and smoothed alternating current. The valves shown are of the indirectly heated type and the heaters may be energized from a source of alternating current applied to terminals 27. Current from the output of the amplifier $V_1$, $V_2$ and $V_3$ is applied by a transformer 24 to the ends of the cylinder 8.

The cylinder 9, together with its associated magnetic circuit, constitutes an electric generator which feeds the amplifier whilst the cylinder 8, with its associated magnetic circuit, constitutes an electric motor which is driven from the output of the amplifier. By providing a suitable amount of amplification in the amplifier $V_1$, $V_2$, $V_3$ the losses in the vibratory system and in its associated electric and magnetic circuits can be made up and the vibratory device will be maintained in vibration. If desired, means may be provided for adjusting the amplification. The surplus energy which is not required for maintaining the vibration may be taken from the output terminals 25. This oscillatory energy may, for example, be used for synchronization purposes in television.

When assembling the vibratory device, care is taken that the springs 15, 16, 20 and 21 are so attached that their effective lengths will not change appreciably when the cylinders 8 and 9 are vibrated at the maximum amplitude at which they are to be required to work in practice. In this way, and because the mass and compliance of the vibratory system are lumped, the natural frequency of the system will be substantially independent of the amplitude of vibration of the cylinders 8, 9 and the velocity of the cylinders will change substantially sinusoidally. Since the electromotive force generated by the generator part is proportional to the velocity of the cylinders 8, 9, the wave form of the generated electrical oscillations will also be substantially sinusoidal and of very constant frequency.

Small adjustments of the natural frequency of vibration of the mechanical system can be effected by rotating the parts 1 and 2 of the casing relatively to one another, thereby increasing the torque (and therefore decreasing the diameter) of all the four springs in the position of rest with one direction of relative rotation of the parts 1 and 2 and decreasing the torque on all the springs with the other direction of relative rotation.

It will be noticed that the cylinders 8, 9 are mounted for vibration about an axis which passes through their centre of gravity, and which is the axis about which the moment of inertia of the cylinders is a minimum. Thus, with this arrangement, the maximum bulk of metal, and accordingly the maximum electrical efficiency, is obtained for any given effective mass in the vibratory system.

Referring now to Fig. 4, the moving conductors 8', 9' constituting the mass element of the vibratory system are in the form of discs united by a rod 10'. The ends of the rod 10' are mounted in jewelled bearings carried on the members 13', 14'. The magnetic circuit associated with each of the discs 8', 9' comprises an annular polar portion 28, an annular part 29 of the end plate 30, the cylindrical wall 31 and the central annular portion 32 having an annular polar portion 33. The magnetic circuits are energized by a coil 5' surrounding each of the discs 8' and 9'. Spiral springs 15' and 16' have their inner ends connected to the peripheries of the discs 8' and 9' respectively, and their outer ends connected to the formers of the coils 5'. The outer ends of the springs are electrically connected to terminals 18' and 19' respectively. As before the springs 15' and 16' are of opposite hand. Two further springs 20' and 21', also of opposite hand, are provided between the rod 10' and the annular polar portion 28. The disc 9' is adapted to vibrate in the air gap between the parts 28 and 33 and thereby to develop potential differences between the terminal 19' and the terminal 34' which is in electrical connection with the casing 30. These potential differences are amplified and impressed between the terminals 18' and 34'. In this case also the armatures of the motors and generator portions are constituted by conductors 8' and 9' but in the present example these conductors are of disc shape whereas in Figure 1 they are cylindrical.

The invention is clearly capable of many modifications within the scope thereof as defined in the appended claims.

I claim:

1. An electro-mechanical vibratory system comprising a frame, a motor portion, a generator portion mechanically coupled to said motor portion, both of said portions comprising an electrical conductor and being mounted for vibration relatively to said frame, a compliance element mechanically connected between said portions and said frame and adapted to return said portions to a position of rest after displacement, means for maintaining a magnetic field of substantially constant intensity in a direction transverse of said conductors, connecting means for passing alternating current through the conductor of said motor portion to produce vibratory motion thereof and connecting means for taking from the conductor of said generator portion alternating current generated therein in response to vibratory motion thereof.

2. An electro-mechanical vibratory system according to claim 1, wherein screening means are provided between the conductors of said motor and generator portions for preventing electromagnetic coupling therebetween.

3. An electro-mechanical vibratory system comprising a frame, a motor portion, a generator portion mechanically coupled to said motor portion, both of said portions comprising an electrical conductor and being mounted for vibration relatively to said frame about a common axis passing substantially through their centres of gravity, a compliance element mechanically connected between said portions and said frame and adapted to return said portions to a position of rest after displacement, means for maintaining a magnetic field of substantially constant intensity in a direction transverse of said conductors, connecting means for passing alternating current through the conductor of said motor portion to produce vibratory motion thereof and connecting means for taking from the conductor of said generator portion alternating current generated therein in response to vibratory motion thereof.

4. An electro-mechanical vibratory system comprising a frame, a motor portion, a generator portion rigidly connected to said motor portion, both of said portions comprising an electrical conductor and being mounted for vibration about a common axis passing substantially through their combined centre of gravity, a compliance element mechanically connected between said portions and said frame and adapted to return said portions to a position of rest after displacement, means for maintaining a magnetic field of substantially constant intensity in a direction transverse of said conductors, connecting means for passing alternating current through the conductor of said motor portion to produce vibratory motion thereof and connecting means for taking from the conductor of said generator portion alternating current generated therein in response to vibratory motion thereof.

5. An electro-mechanical vibratory system comprising a frame, a motor portion, a generator portion rigidly connected to said motor portion, both of said portions comprising an electrical conductor and being mounted for vibration about a common axis passing substantially through their common centre of gravity and being that axis about which the combined moments of inertia of said portion is substantially a minimum, a compliance element mechanically connected between said portions and said frame and adapted to return said portions to a position of rest after displacement, means for maintaining a magnetic field of substantially constant intensity in a direction transverse of said conductors, connecting means for passing alternating current through the conductor of said motor portion to produce vibratory motion thereof and connecting means for taking from the conductor of said generator portion alternating current generated therein in response to vibratory motion thereof.

6. An electro-mechanical vibratory system comprising a hollow member of magnetic material having a cylindrical inner surface, a cylindrical pole piece of magnetic material fixedly mounted within said hollow member and in co-axial relation to said surface, said inner surface and the outer surface of said pole piece being spaced apart to form an air gap between them, a core of magnetic material uniting said hollow member and said pole piece and constituting therewith parts of a magnetic circuit, means for establishing a magnetomotive force in said magnetic circuit, an armature in the form of a hollow cylinder of conducting material mounted in said air gap for vibration relatively to said hollow member and said pole piece about the axis thereof, spring means connected between said armature and said parts and adapted to return said armature to a position of rest after displacement thereof relatively to said parts, and means for making separate electrical connection with both ends of said cylindrical armature.

7. An electro-mechanical vibratory system having a motor portion and a generator portion each of said portions comprising a hollow member of magnetic material having a cylindrical inner surface, a cylindrical pole piece of magnetic material fixedly mounted within said hollow member and in coaxial relation to said surface, said inner surface and the outer surface of said pole piece being spaced apart to form an air gap between them, a core of magnetic material uniting said hollow member and said pole piece and constituting therewith parts of a magnetic circuit, means for establishing a magnetomotive force in said magnetic circuit, an armature in the form of a hollow cylinder of conducting material mounted in said air gap for vibration relatively to said hollow member and said pole piece about the axis thereof, spring means connected between said armature and said parts and adapted to return said armature to a position of rest after displacement thereof relatively to said parts, and means for making separate electrical connection with both ends of said cylindrical armature, the armature of said motor portion being rigidly connected to the armature of said generator portion and said parts of the magnetic circuits of said motor and generator portions being rigidly connected together.

8. An electro-mechanical vibratory system comprising a pair of magnetic pole pieces with juxtaposed substantially flat annular surfaces constituting boundaries of an air gap, magnetic material forming a magnetic circuit between said pole pieces, means for establishing a magnetomotive force in said magnetic circuit, an armature in the form of a disc of conducting material mounted in said air gap for vibration relatively to said pole pieces about an axis perpendicular to said surfaces, spring means forming a yielding connection between said armature and said pole pieces serving to return said armature to a position of rest after displacement thereof relatively to said pole pieces, and connecting means for making separate electrical connection with the centre and periphery of said disc, whereby alternating voltage applied between said connecting means serves to produce oscillatory motion of said armature relatively to said pole pieces.

9. An electro-mechanical vibratory system having a motor portion and a generator portion each of said portions comprising a pair of magnetic pole pieces with juxtaposed substantially flat annular surfaces constituting boundaries of an air gap, magnetic material forming a magnetic circuit between said pole pieces, means for establishing a magnetomotive force in said magnetic circuit, an armature in the form of a disc of conducting material mounted in said air gap for vibration relatively to said pole pieces about an axis perpendicular to said surfaces, spring means forming a yielding connection between said armature and said pole pieces serving to return said armature to a position of rest after displacement thereof relatively to said pole pieces, and connecting means for making separate electrical connection with the centre and periphery of said disc, whereby alternating voltage applied between said connecting means serves to produce oscillatory motion of said armature relatively to said pole pieces, said armature of said motor and generator portions being rigidly connected together and said pole pieces of said motor and generator portions being rigidly connected together.

10. An electro-mechanical vibratory system comprising a frame, a motor portion mounted for vibration about an axis in response to alternating current fed thereto, a generator portion rigidly connected with said motor portion and mounted for vibration about said axis, alternating voltage being developed in said generator portion in response to vibration thereof, and, interconnecting said frame and said portions, two spiral springs serving to return said portions to a position of rest after displacement relatively to said frame, said springs being of opposite hand so that relative movement in one sense between said frame and said portions causes one of said springs to increase in diameter and the other to decrease in diameter.

GEORGE WILLIAM WALTON.